(12) United States Patent
Shintani et al.

(10) Patent No.: US 8,055,440 B2
(45) Date of Patent: Nov. 8, 2011

(54) METHOD, APPARATUS AND SYSTEM FOR USE IN NAVIGATION

(75) Inventors: Peter Shintani, San Diego, CA (US); Art Ozaki, Escondido, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 219 days.

(21) Appl. No.: 11/560,264

(22) Filed: Nov. 15, 2006

(65) Prior Publication Data
US 2008/0114541 A1 May 15, 2008

(51) Int. Cl.
*G01C 21/00* (2006.01)
(52) U.S. Cl. ........ 701/200; 701/201; 701/208; 701/209; 701/210; 340/995.1; 340/995.15; 340/995.13; 340/995.27; 715/205; 715/774
(58) Field of Classification Search ............... 701/24, 701/200, 207; 340/995.1, 995.13, 995.15, 340/995.27; 715/205, 774
See application file for complete search history.

(56) References Cited

U.S. PATENT DOCUMENTS

| | | | | |
|---|---|---|---|---|
| 6,282,491 | B1* | 8/2001 | Bochmann et al. | 701/209 |
| 6,351,705 | B1* | 2/2002 | Yoshioka | 701/200 |
| 6,650,997 | B2* | 11/2003 | Funk | 701/207 |
| 6,816,782 | B1 | 11/2004 | Walters et al. | |
| 7,343,564 | B2* | 3/2008 | Othmer | 715/774 |
| 2001/0020212 | A1* | 9/2001 | Urban et al. | 701/200 |
| 2002/0036584 | A1* | 3/2002 | Jocoy et al. | 342/70 |
| 2003/0212479 | A1* | 11/2003 | Baghshomali et al. | 701/24 |
| 2003/0236598 | A1* | 12/2003 | Villarreal Antelo et al. | 701/19 |
| 2004/0119727 | A1* | 6/2004 | Dietz et al. | 345/629 |
| 2004/0176906 | A1* | 9/2004 | Matsubara et al. | 701/200 |
| 2004/0193364 | A1* | 9/2004 | Chojnacki | 701/200 |
| 2004/0204822 | A1* | 10/2004 | Kohno et al. | 701/200 |
| 2005/0003834 | A1* | 1/2005 | Hughes | 455/456.1 |
| 2005/0138662 | A1* | 6/2005 | Seto | 725/75 |
| 2005/0182561 | A1* | 8/2005 | Yamada et al. | 701/209 |
| 2005/0245241 | A1* | 11/2005 | Durand et al. | 455/414.1 |
| 2005/0246095 | A1* | 11/2005 | Banet et al. | 701/208 |
| 2005/0288832 | A1* | 12/2005 | Smith et al. | 701/19 |
| 2006/0262103 | A1* | 11/2006 | Hu et al. | 345/173 |
| 2006/0287811 | A1* | 12/2006 | Rentel | 701/200 |
| 2008/0015772 | A1* | 1/2008 | Sanma et al. | 701/207 |
| 2008/0114541 | A1* | 5/2008 | Shintani et al. | 701/209 |

FOREIGN PATENT DOCUMENTS

| | | |
|---|---|---|
| JP | 2001-296133 | 10/2001 |
| JP | 2003-152884 | 5/2003 |
| KR | 2004050749 | * 10/2005 |

* cited by examiner

*Primary Examiner* — Mark Hellner
*Assistant Examiner* — Redhwan k Mawari
(74) *Attorney, Agent, or Firm* — Fitch, Even, Tabin & Flannery

(57) ABSTRACT

The present embodiments provide methods, processes and systems for use in determining navigation. Some embodiments provide methods that receive a communication at a mobile navigation system from an external device, determine whether the communication comprises navigation information, extract the navigation information when the communication comprises navigation information, identify a navigation location based on the navigation information, retrieve a current location, and generate navigation instructions between the current location and the navigation location.

10 Claims, 5 Drawing Sheets

METHOD, APPARATUS AND SYSTEM FOR USE IN NAVIGATION

FIELD OF THE INVENTION

The present embodiments relate generally to navigation, and more particularly to utilizing and/or supplying information to a navigation system.

BACKGROUND

Navigation systems have been incorporated into vehicles. These navigation systems provide users with navigation directions between a starting point and a destination. Often these navigation directions are provided as graphically depicted maps and/or audio instructions. Based on the navigation instructions, vehicle operators can often times more easily reach the desired destination.

Typically, these navigation systems store map information locally. This map information is then utilized in providing the graphical and/or audio navigation directions. In requesting navigation instructions, the user typically manually enters a desired destination. Based on a current location and the desired destination, the navigation system accesses the map information to retrieve the navigation instructions.

SUMMARY OF THE EMBODIMENT

The present invention advantageously addresses the needs above as well as other needs through the provision of the method, apparatus, and system for use in implementing navigation. Method according to some embodiments receive a communication at a mobile navigation system from an external device, determine whether the communication comprises navigation information, extract the navigation information when the communication comprises navigation information, identify a navigation location based on the navigation information, retrieve a current location, and generate navigation instructions between the current location and the navigation location.

Some embodiments provide methods for use in acquiring navigation directions. These method receive a transmit command in a wireless communication device, identify location information stored in the wireless communication device associated with the command, identify a receiving mobile navigation system, generate a communication comprising formatting the communication to be recognized by the navigation system as intended for use by the navigation system, and transmit the communication.

A better understanding of the features and advantages of the present invention will be obtained by reference to the following detailed description of the invention and accompanying drawings which set forth an illustrative embodiment in which the principles of the invention are utilized.

BRIEF DESCRIPTION OF THE DRAWINGS

The above and other aspects, features and advantages of the present embodiments will be more apparent from the following more particular description thereof, presented in conjunction with the following drawings wherein.

Figure 1:
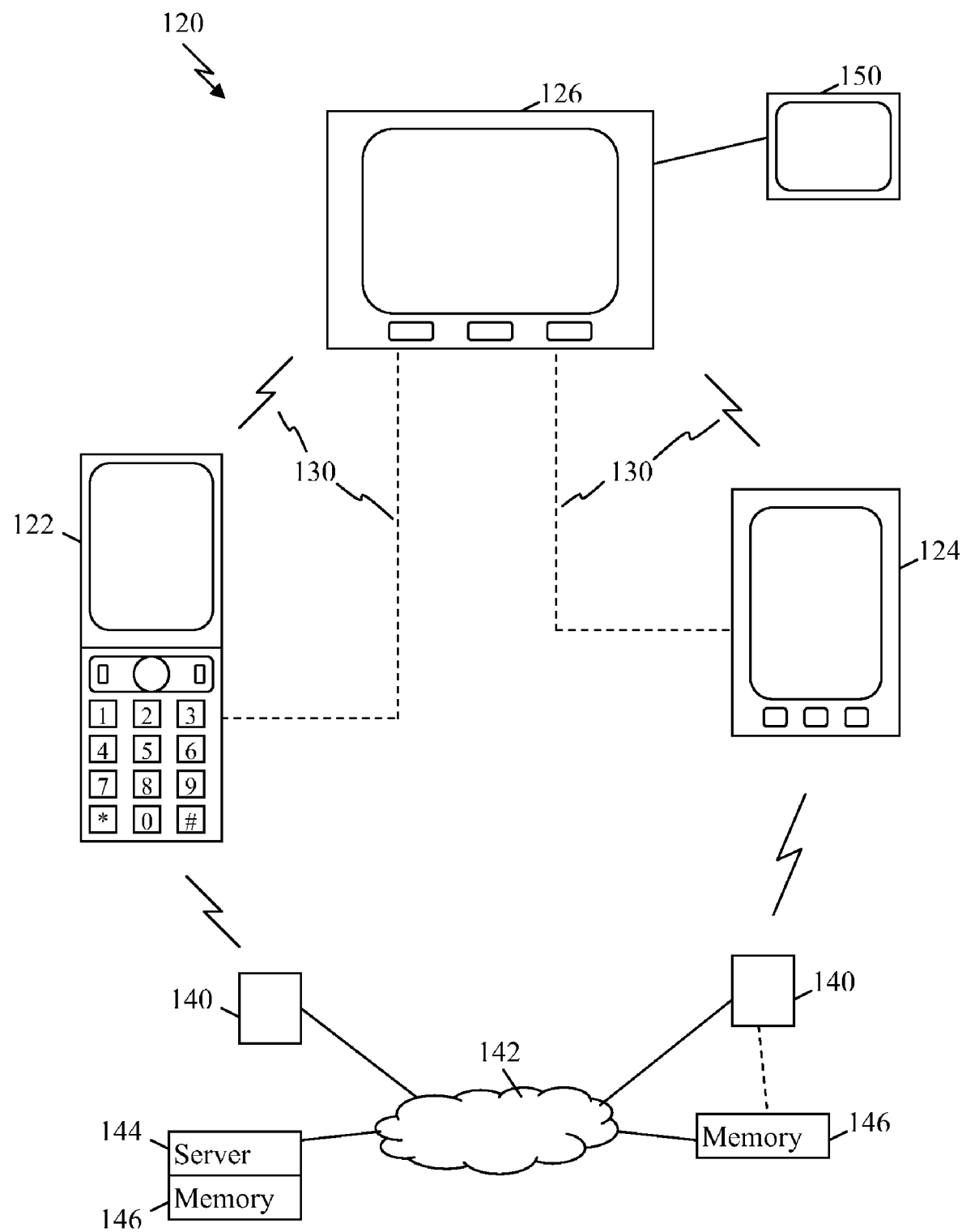
FIG. 1 depicts a simplified block diagram of a system according to some embodiments that allows one or more consumer electronic devices to communicate with one or more mobile navigation systems.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The present embodiments provide methods, systems, apparatuses, computer program products for use in obtaining navigation information. These embodiments at least in part reduce the complexity and simplify the process of obtaining navigation information. By providing communication between a consumer electronic device and a navigation system, information can be provided to the navigation system from the consumer electronic device without a user having to manually enter information utilized in obtaining navigation information.

Many consumer electronic devices, such as wireless cellular phones, personal digital assistances (PDA), wireless radio communication devices, electronic address book devices and/or other consumer electronic devices contain location information and/or can retrieve location information. Based on this information, a user can manually enter location information into a navigation system that allows the navigation system to provide navigation instructions and/or directions to or from a location associated with the location information. Some present embodiments, however, provide communication between the consumer electronic device and the navigation system so that the user does not have to manually enter the location information into the navigation system.

FIG. 1 depicts a simplified block diagram of a system 120 according to some embodiments that allows one or more consumer electronic devices (e.g., cell phone 122, 124) to communicate with one or more mobile navigation systems 126. The electronic consumer devices can include, but are not limited to, wireless cellular phones, personal digital assistances (PDA), wireless radio communication devices, electronic address book devices, other wireless communication devices, and/or substantially any other relevant consumer electronic device. The embodiments are described below with reference to a cell phone 122, 124 for simplicity. It will be apparent, however, to those skilled in the art that other consumer electronic devices can also be utilized.

Communication links 130 allow the cell phones 122, 124 (or other electronic devices) to communicate with the mobile navigation system 126. These communication links can be wired or wireless communication links. For example, a wireless link can be established through Bluetooth, ultra-wideband, infrared (IR), Wi-Fi, radio frequency (RF), and/or other relevant wireless communication. These communication links 130 not only allow audio data to be transmitted between the wireless devices and the navigation system, but in some implementations can also allow textual, graphical, image and/or multimedia data to be communicated from the cell phone 122, 124 to the navigation system 126. Additionally or alternatively, commands and/or instructions can be communicated over the communication links from the wireless devices to the navigation system.

The cell phones 122, 124 are typically also communicationally coupled with one or more base stations, base station controllers, mobile switching centers, base transceiver stations and/or other communication devices of a wireless network. The devices of the wireless network can further couple with a distributed network 142, such as the public switching telephone network, the Internet, local area networks, wide area networks and/or other networks establishing communication links between the wireless devices and other telephones, cellular phones, servers 144, memory 146 and/or other devices. In some instances, the navigation system 126 can couple with other devices 150 (e.g., secondary displays, other multimedia devices and the like) and/or be part of a local network.

The communication between the cell phone 122, 124 and the navigation system 126 can include text data (e.g., text messaging), multimedia data, Internet data and/or other data and/or information. Further, some cell phones are relatively basic, while other cell phones or other electronic devices have additional functionally. For example, some cell phones can establish wireless cellular communication between other cellular phones and/or transmit text messages (e.g., using short message service (SMS)). Other cell phones may be able to transmit and/or receive photographic images, while still other cell phones may have the additional functionality to access the Internet (e.g., through a wireless browser). Other functionality and/or capabilities can be provided in cell phones and/or other electronic devices.

Figure 2:
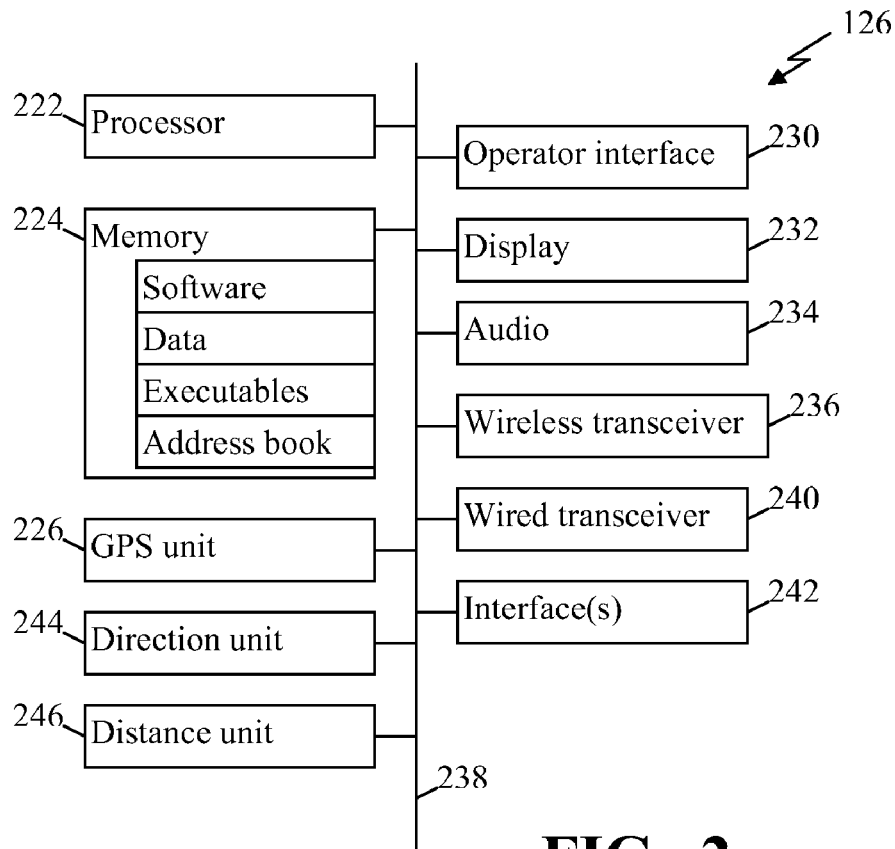
FIG. 2 depicts a simplified block diagram of a navigation system according to some embodiments.

FIG. 2 depicts a simplified block diagram of a navigation system 126 according to some embodiments. The navigation system can include a controller or processor 222, a memory 224, a global positioning satellite (GPS) unit 226, an operator interface 230, a display 232, audio output unit 234, a wireless transceiver 236 and a communication path or network 238. In some instances, the navigation system can optionally include a wired transceiver 240, one or more interfaces 242, a directional sensing unit 244 and a distance unit 246. Other location detection devices can additionally or alternatively be included such as, but not limited to, inertia sensors, magnetic compass, vehicle speed sensors and or other means to gather positioning information. The controller 222 provides control over the navigation system 126 and can be implemented through a single-processor or multiprocessor computer systems, minicomputers and/or other such controllers. One or more of the components of the navigation system can be implemented through hardware, software, executables and/or other such implementations. For example some aspects of the navigation system can be implemented through program modules that can include programs, components, routines, data structures, and the like, that perform particular tasks or implement particular abstract data types. Additionally or alternatively, some embodiments can employ distributed computing where certain tasks are performed by remote processing devices (e.g., servers 144, base stations, or other devices) that are linked through a wired and/or wireless communication links and/or distributed network 142, with program modules capable of being located in one or both local and remote memory storage devices 146.

The memory 224 typically includes one or more computer-readable media that is accessed by the controller 222, the other components of the navigation system and/or external devices or components, and can include volatile media, non-volatile media, removable media and/or non-removable media (e.g., computer storage media and communication media), such as but not limited to, RAM, ROM, EEPROM, flash memory, CD-ROM, digital video disk (DVD) or other optical disk storage, magnetic cassettes, magnetic tape, magnetic disk storage or other magnetic storage devices, or any other media that can be used to store the desired information and which can be accessed by a processor, computer or other components. Further, the memory can be implemented through and/or include an internal or external hard disk drive. Typically, the memory stores program modules, software, executables and/or other software that is utilized by the controller 222 and/or other components of the navigation system in implementing the operation of the system.

The communication path 238 can be one or more of several types of communication and/or bus structures that may further interconnect to other communication links or buses. For example, the communication path 238 can include, but is not limited to, a memory bus (with or without a memory controller), a peripheral bus, and/or a local bus using one or more of a variety of bus architectures.

The operator interface 230 allows the user to enter data, make selections, initiate operations, insert commands and the like. The operator interface can include, but is not limited to, buttons, dial controls, soft buttons, the display can be a touch screen (as described below), pointing devices, voice recognition, wired or wireless remote control(s), and/or other such interfaces. The display 232 couples with the controller 222 and displays data, graphics, multimedia data, soft keys and/or buttons, graphical user interfaces and the like. In some implementations the display is a touch screen that allows a user to make selections, highlight and/or otherwise interact with the navigation system by touching the screen (e.g., touching the screen with a finger, stylus or the like). The audio output unit 234 produces an audible output through internal and/or external speakers, head seat connector, amplifier and/or other such audio output.

The one or more interfaces 242 can allow one or more consumer electronic devices to couple with the navigation system 126 and/or allow other peripheral devices to connect with the navigation system, such as pointing devices (e.g., stylus, mouse, etc.), microphone, keyboard, other displays or multimedia devices, audio devices and/or other such devices. The interfaces can include substantially any interface such as a USB port interface, serial port interface, IR or other wireless interface(s) (e.g., Bluetooth), gaming interface and/or other such interfaces. Further as described above, the display 232 in some instances is a touch screen that allows a user to select options, select and/or highlight portions of content, enter data and/or perform other functions utilizing the display. The audio output unit 234 can receive and/or emit audible audio, and/or can interface with a vehicles audio system. The interfaces 242, in some implementations, can for example provide one or more interfaces to connect audio output devices (e.g., external speakers) to couple with the navigation system.

The GPS unit 226 receives satellite information regarding a relative geographic position of the navigation system, which can be incorporated into, for example a vehicle. This provides the navigation system 126 with a location of the system. The direction and distance units 244, 246 allow the system to determine a direction of orientation and make adjustments regarding current locations, anticipated movement of the system, and/or other such functions.

The wireless transceiver 236 and the wired transceiver 240 allow the navigation system 126 to communicate with the cell phone 122, 124. These transceivers transmit and receive communications between at least the navigation system and wireless device (e.g., cell phone 122). Data, multimedia content, scripts, instructions, commands, option selections and/or other information can be communicated at least from the cell phone 122 to the navigation system 126. This information can further include location information. The location information can be utilized by the navigation system to determine navigation instructions and/or directions.

Figure 3:
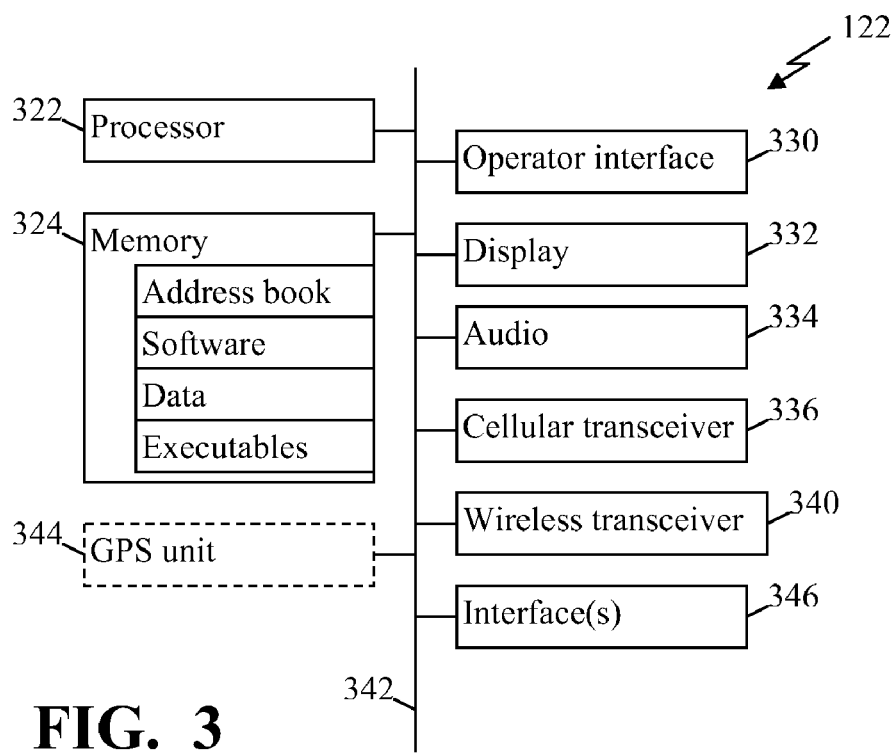
FIG. 3 depicts a simplified block diagram of a consumer electronic device, such as a wireless phone that can be employed in the system of FIG. 1.

FIG. 3 depicts a simplified block diagram of a consumer electronic device, such as a cell phone 122. The wireless phone includes a controller or processor 322, a memory 224, an operator interface 330, a display 332, audio output unit 334, a cellular transceiver 336, a second transceiver 340, and a communication path or network 342. The phone can in some instances further include a GPS unit 344, one or more interfaces 346 and/or other components or units. The controller 322 provides control over the phone and can be implemented through a single or multi-processor system, minicomputers and/or other such controllers. One or more of the components of the phone can be implemented through hardware, software, executables and/or other such implementations or combinations of implementations. For example many of the functions and features provided through the phone can be implemented through program modules that can include programs, routines, components, data structures, and the like. Additionally, the phone can communicate wirelessly with remote systems to perform functions.

The memory 324 typically includes one or more computer-readable media that is accessed by the controller 322 and the other components of the cell phone 122, and can include volatile media, nonvolatile media, removable media and/or non-removable media (e.g., computer storage media and communication media), such as but not limited to, RAM, ROM, EEPROM, flash memory, removable memory (e.g., a subscriber identity module (SIM) card) and other relevant media or combinations of media. In some instances, the memory contains a user address book, other user data, phone data, executables, programs, data and the like.

The operator interface 330 allows the user to enter data, make selections, initiate operations, insert commands and other such operations. The operator interface can include, but is not limited to, buttons, dial controls, soft buttons, the display can be a touch screen (as described below), pointing devices, graphical user interface(s), voice recognition, wired or wireless remote control(s), and/or other such interfaces. The display 332 couples with the controller 322 and displays data, graphics, multimedia data, soft keys and/or buttons, graphical user interfaces and the like. In some implementations the display is a touch screen that allows a user to make selections, highlight and/or otherwise interact with the navigation system by touching the screen (e.g., with a stylus, finger, other such pointing devices or combinations thereof). The audio output unit 234 produces an audible output through internal and/or external speakers, head set connector adaptor and/or other such audio output.

The cellular transceiver 336 establishes wireless cellular communication links with one or more cellular systems or networks. The transceiver transmits and receives communications between the cell phone 122 and one or more base stations, base station transceivers, mobile switching centers or other devices of a cellular network 140. Voice, data, multimedia content, scripts, instructions, commands, option selections, control instructions and/or other information can be communicated through the cellular transceiver. For example, in some implementations, the cell phone 122, 124 can be configured to access the Internet and receive web pages and other information that can at least in part be displayed on the display 332.

The second transceiver 340 provides local communication. In some implementations, the second transceiver provides wireless communication, such as, through Bluetooth, Wi-Fi, ultra wideband and/or other wireless communication protocols or combinations of protocols. Alternatively or additionally, the second transceiver can provide a wired transceiver that allows the cell phone 122 to couple with the navigation system 126.

In some implementations, the cell phone 122, 124 can include the GPS unit 344 that receives satellite information regarding a relative geographic position of the phone. This geographic information can be displayed to the user, and/or forwarded to a navigation system as described above and further below. The one or more interfaces 346 allow one or more peripheral devices to couple with the cell phone 122. The interfaces can include power interface, a USB port interface, serial port interface, IR or other wireless interface(s) (e.g., Bluetooth) and/or other such interfaces.

The present embodiments allow information to be transferred from the cell phone 122, 124 to the navigation system 126 such that the navigation system can use the information in identifying a location and determining navigation information, directions and/or instructions to the identified location. By providing information from the cell phone a user does not have to manually enter the data into the navigation system. Further, many cell phones, such as those cell phones that have Internet access can acquire location information from over the Internet and forward some or all of that information to the navigation system 126 for use in determining navigation.

Figure 4:
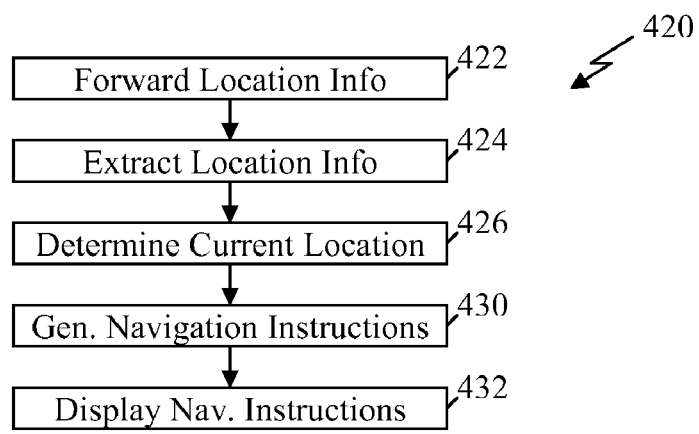
FIG. 4 depicts a simplified flow diagram of a process for use in obtaining navigation directions and/or instructions.

FIG. 4 depicts a simplified flow diagram of a process 420 for use in obtaining navigation directions and/or instructions. In step 422 location information is forwarded to the navigation system. In some instances a communication is transmitted from the cell phone 122 to the navigation system 126, where the communication includes navigation information. The navigation information can include an address, a name (e.g., a name of a company), a phone number, website, and/or other information or combinations of information that can be utilized by the navigation system in identifying a desired geographic location (e.g., a location can be associated with a company, store and the like that can be identified by the navigation system using the name, phone number, web site and/or other relevant information).

In step 424, the location information is extracted from the communication. The extraction can include, for example, parsing the communication data for the desired information, identifying one or more headers or tags, and/or other such methods as fully described below. For example, the information and/or content can be searched looking for one or more key words (e.g., "address", "phone", "fax", "website", "http//", ".com" and the like); hidden text or data (e.g., non displayed labels); other designations; formatting of the content (e.g., the content can be formatted according to a predefined format, such as title portion, data portion, address portion, link portion, etc.); and/or other such identifiers.

In step 426, a current location of the navigation system (e.g., the current location of the vehicle within which the navigation system 126 is incorporated) is determined. Typically, the navigation system utilizes the GPS unit 226 to determine a current geographic location. However, other methods can be employed, such as using GPS information provided by the cell phone, estimated location of the cell phone based on proximity of the phone to communication towers and/or antennas, based on past location information in cooperation with distance and direction of travel as provided by the distance and direction units 244, 246, and/or other such methods.

The process 420 then continues to step 430 where navigation instructions are determined between the current location and the location associated with the location information. In step 432, the navigation instructions are displayed and/or supplied to the user. For example, a graphical map is shown on the display 232 of the navigation system 126, and/or audio instructions are played back through the audio unit 234 as the vehicle travels following the navigation instructions.

In allowing the cell phone 122, 124 to supply the desired location information to the navigation system, the user does not have to manually enter the data into the navigation system. This simplifies the use of the navigation system, provides more accurate results as there is likely to be a reduced number of entering errors by the user, can increase the speed in getting the navigation instructions and other such benefits.

Figure 5:
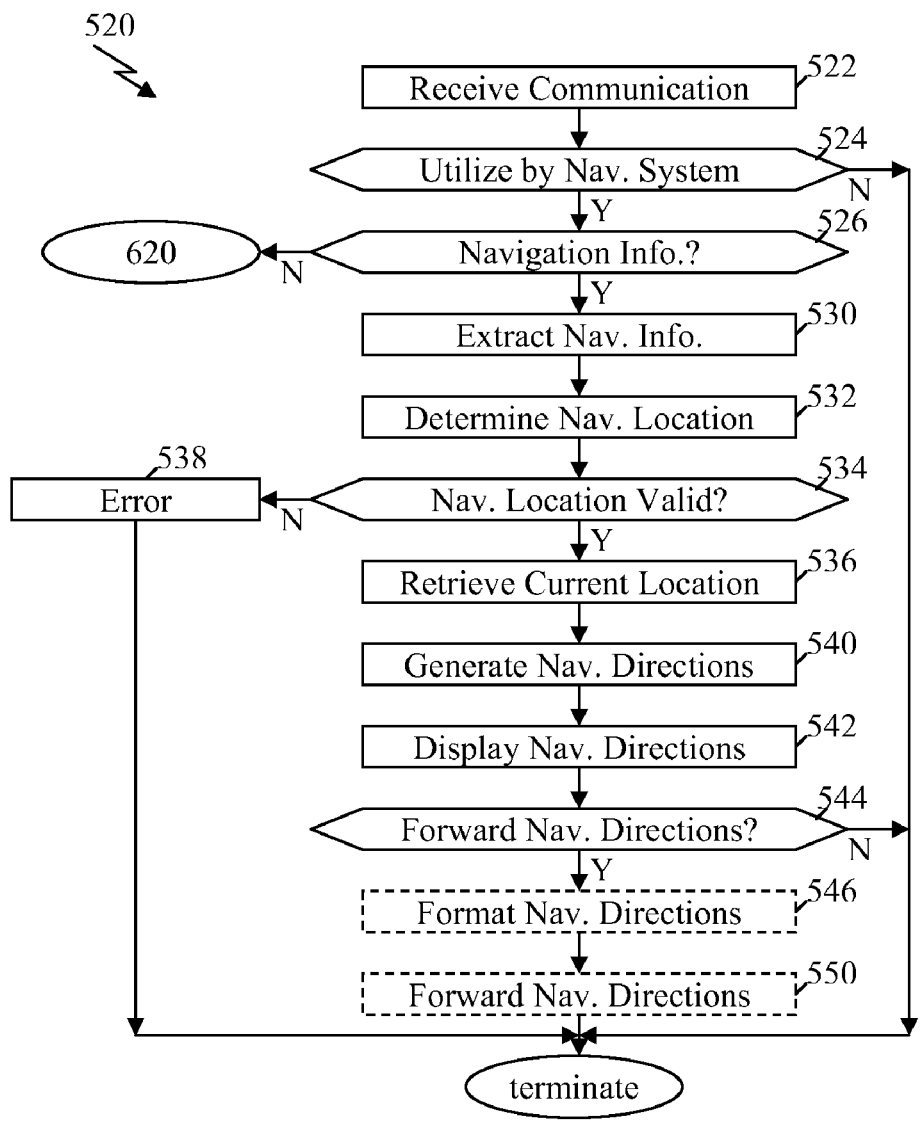
FIG. 5 depicts a simplified flow diagram of a process for use in generating navigation instructions according to some embodiments.

FIG. 5 depicts a simplified flow diagram of a process 520 for use in generating navigation instructions according to some embodiments. In some instances, the process 520 can be implemented for one or more of the steps of the process 420 of FIG. 4. In step 522, the navigation system 126 receives a communication from an external device, such as, from the cell phone 122, 124. The communication can be received through a wireless connection, such as via Bluetooth, ultra-wideband or other such wireless communication, or via a wired connection.

In step 524, it is determined whether the communication is to be utilized by the navigation system. In some implementations, the navigation system relays information between the cell phone and a car or other vehicle's audio system, and/or provides other data transfers. For example, a user can conduct a hands-free phone call using the audio system of the car and the cell phone 122, with the navigation system 126 in part interfacing the cell phone with the audio system of the car. Typically, in such situations a link is established between the navigation system and the cell phone (e.g., through a set up procedure such that the navigation system recognizes the cell phone and/or the cell phone is provided an address or an identifier of the navigation system). As such, the navigation system determines, in step 524, whether the communication is to be utilized by the navigation system. This determination can include determining whether the communication has a header, label, identifier, address or otherwise includes some receiving device designation, identifying the communication as being at least partially directed to the navigation system and/or other such determinations. Additionally or alternatively, the navigation system can parses some or all of the communication to determine whether the communication includes location information, such as an address, name, phone number and/or other location information or location information identifier. Further, the communication can be parsed for location information identifiers, such as tags, labels, partitions, patterns of data, headers, identifiers, types of content, hidden data (e.g., data that is not displayed) and/or other location information identifiers that identify location information within the communication. When the communication is not directed to the navigation system, the process 520 terminates. In some implementations, one or more protocols or standards may be established between one or more cellular phone carriers or cell phone industry and one or more navigation system manufacturers. This protocol will allow, in part, the navigation systems to recognize communications and/or identify location information. Additionally or alternatively, some embodiments may allow a user when sending data to the navigation system to highlight, tag or otherwise identify the address information. For example, the cell phone may provide a soft key that the use could press to tag one or more lines of content displayed on the display 332 of the cell phone where the address is shown.

Alternatively, when it is determined in step 524 that the communication or part of the communication is directed to and/or is to be utilized by the navigation system the process enters step 526 where it is determined whether the communication comprises navigation information and/or a navigation command. Determining whether navigation information is included within the communication can include determining whether the communication has a header, label, identifier or other indication that the communication includes navigation information, and/or searching or parsing some or all of the communication to determine whether the communication includes tags, labels and/or other location identifiers and/or whether location information can be recognized (e.g., address, name, phone number and/or other location information). When location information cannot be identified, the process 520 in some embodiments can activate an optional process 620 as described fully below and/or terminates.

When location information is included and/or can be identified in the communication, step 530 is entered where navigation information is extracted or retrieved from the communication. This extraction can include identifying a portion of content of the communication that has been selected, highlighted and/or otherwise marked (e.g., selected by a user on the cell phone); identifying a selected portion of content that has been highlighted and/or selected on the display 232 of the navigation system (e.g., selected or highlighted by the user on a touch screen or using a pointing device on the display 232); searching or parsing content of the communication for one or more headers, labels, hidden data, or other identifiers; parsing the communication for formatting of the communication; and/or other indications of location information.

Once navigation information is extracted, identified and/or otherwise received, step 532 is entered where a navigation location based on the navigation information is identified. In some instances, the navigation information includes an address that can be used to search a database, listing or the like to find coordinates (e.g., latitude and/or longitude coordinates), mapping information, or other such data that can be used in determining a relative location for the navigation location and/or for mapping. Additionally in some applications, the navigation information can be used to search a database, listing or other information to identify further navigation information that can be additionally or alternatively used in getting location information. For example, the navigation information may include a name or phone number that can be used to search one or more listings and/or databases to identify additional navigation information, such as an address for the business. Further in some embodiments, the navigation information can be displayed on the display 232 requesting the user to confirm the information, allowing the user to alter the information, requesting the user to select one of a plurality of locations (e.g., when a search based on a company name gives more than one address), or the like.

In step 534, it is determined whether the navigation location is valid and/or can be identified and located within mapping and/or directional information of the navigation system 126. When the navigation location is valid, the process continues to step 536. Alternatively, step 538 is entered where the navigation system generates an error (e.g., displays an error message, generates an audible notification, or otherwise indicates that the navigation location is incorrect or not recognized), additional information can be requested, and/or information can be forwarded by the navigation system 126 to the cell phone 122, 124 requesting the cell phone to acquire or request additional information (e.g., when the cell phone can access the Internet or other distributed network 142 to retrieve further information).

In step 536, the navigation system retrieves a current location of the vehicle. In some instances, the GPS unit 226 is used to determine a current location. Additionally or alternatively, the directional sensing unit 244 and the distance detection unit 246 can be used in determining a current location. In step 540, the navigation system based on the navigation location and the current location determines and/or generates navigation directions and/or instructions between the current location and the navigation location. In step 542, the navigation directions are displayed and/or audibly produced.

In step 544, the process determines whether some or all of navigation directions are to be forwarded to the cell phone and/or other external device. In some instances, some or all of the navigation directions, which might include graphics data, textual data, audio data and/or other such information, can be forwarded to the cell phone for use away from the navigation system. For example, when the user has to park a vehicle a distance from a desired destination location, the navigation system can forward some or all of the navigation directions and/or graphics to the cell phone to be accessed by the user when away from the navigation system in reaching the desired destination. When it is determined in step 544 that the information is not to be forwarded to the cell phone or other device, the process terminates.

Alternatively, the process can continue to an optional step 546 where some or all of the navigation directions to be forwarded to the cell phone or other external device is formatted for the device. For example, the cell phone typically has a display with a lower resolution than the navigation system, may be slower and/or may have a reduced processing capability relative to the navigation system. As such, the navigation system may format the data to be more readily usable on the cell phone (e.g., reduce the pixel resolution of graphics, simplifying textual directions, encode the data using certain encoding scheme and/or such formatting). In step 550, the formatted one or more portions of navigation directions are forwarded to the cell phone or other external device.

As introduced above, the navigation system 126 can additionally utilize information supplied by the cell phone 122, 124 or other external device. In some instances, multimedia data for example can be received by the navigation system and displayed on the display 232 and/or routed to a secondary display 150 within the vehicle to be displayed.

Figure 6:
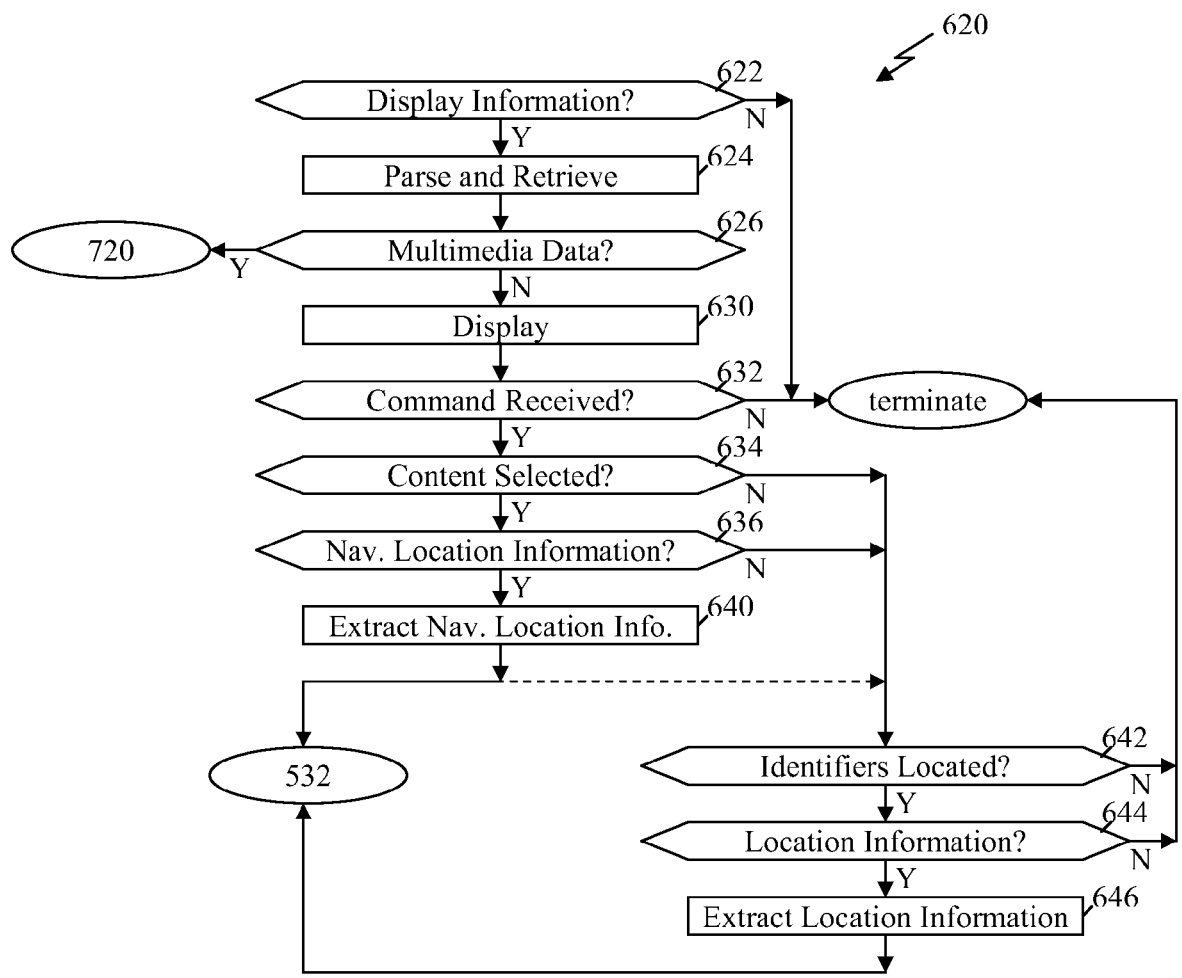
FIG. 6 depicts a simplified flow diagram of a process that allows the navigation system, such as the system of FIG. 2, to utilize and/or display data and/or information supplied to the navigation system.

FIG. 6 depicts a simplified flow diagram of a process 620 that allows the navigation system to utilize and/or display data and/or information supplied to the navigation system. In some implementations, the process 620 is utilized in cooperation with the process 520 of FIG. 5 in generating navigation instructions and/or displaying the navigation instructions. For example, the process 620 can be utilized following and/or as part of step 524 in determining whether the communication is to be utilized by the navigation system, and/or in implementing some or all of step 526 in determining whether the communication includes navigation information.

In step 622 it is determined whether a communication received at the navigation system contains display information. When the received information does not include display information, the process 620 terminates. Alternatively, when the received communication does include display information (e.g., graphical information, graphical user interface information, multimedia data, and/or other such displayable information), step 624 is entered where the received information is parsed and the displayable information is retrieved. In step 626, it is determined whether display information is multimedia information, such as video data, picture data and/or other such multimedia information, and in some instances can include some Internet data. When the information does include multimedia data the process 620 activates a process 720 shown in FIG. 7 and described further below that in part controls the playback of multimedia content. The process alternatively continues to step 630 when the information does not include multimedia data.

In step 630, the received display data is displayed, for example, on the local navigation system display 232. In step 632, the process continues to determine whether an activation command, navigation command or the like is received. As described above, the navigation system 126 includes an operator interface 230 with one or more buttons, soft buttons, displayed options and/or other user inputs. One or more of these operator interface inputs can allow a user to select an activation button or navigation button that causes the navigation system to determine and/or generate navigation directions based on two or more locations (e.g., a current location and a destination location). When there is no activation command received, the process terminates.

When an activation command is received, the process continues to step 634 to determine whether at least some of the content displayed on the local navigation system display 232 is selected, highlighted or otherwise identified by a user. As described above, a user can use a pointing device, interact with a touch screen or otherwise select some or all of content displayed. For example, a user can highlight an address, a name of a company, a phone number and/or other information. When it is determined that no content is selected the process skips to step 642. Alternatively, step 636 is entered to determine whether the selected content contains navigation location information. This determination can be based on detecting a location identifier, a tag, a label, hidden text, parsing the selected content searching for patterns and/or other methods in attempts to determine whether navigation location information is selected. When the system cannot identify navigation location information the process skips to step 642. Step 640 is entered when navigation location information is identified and the navigation location information is extracted. Following step 640, the process 620 can in some implementations terminate and return to step 532.

In step 642, some or all of the received information and/or data is searched or parsed to determine whether the content contains labels, partitions, patterns, hidden text and/or other identifiers of navigation location information. When navigation location information cannot be identified, the process terminates. Alternatively, when navigation location information can be identified, step 644 is entered where it is determined whether the identified portion of content includes location information. When location information cannot be found the process terminates and can notify the user. Alternatively, the location information is extracted in step 646, and in some implementations, returns to step 532 of the process 520 of FIG. 5.

Figure 7:
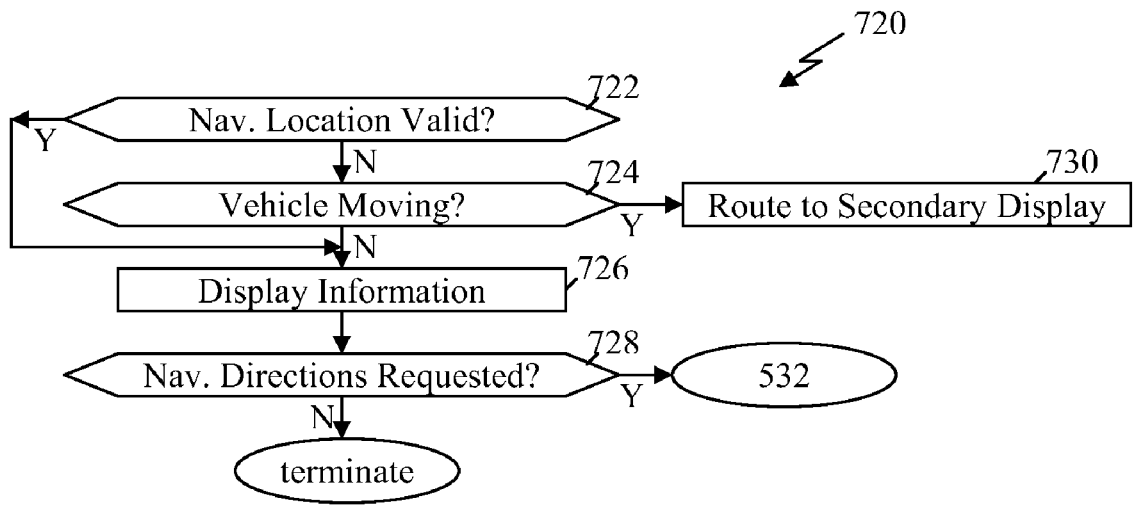
FIG. 7 shows a flow diagram of a process that in part controls the display of information.

FIG. 7 shows a flow diagram of a process 720 that in part controls the display of information. As introduced above, the process 720 can be activated following step 626 when the information does include display information, such as multimedia content. Additionally or alternatively, the process 720 can be activated in other instances when display content is to be displayed on the display 232 of the navigation system 126.

In step 722, the process determines whether the multimedia data is navigation information and/or directions. When the multimedia data is navigation information, the process skips to step 726. Alternatively, the process continues to step 724 where it is determined whether a vehicle containing the navigation system is moving. In some instances there is a threshold speed that has to be exceeded to indicate in step 724 that the vehicle is moving (e.g., exceeding 5 mph). When the vehicle is moving, the process skips to step 730. Alternatively, step 726 is entered where the display information (and/or audio information) is forwarded to the display 232 (and/or audio output unit 234). In step 728, it is determined whether navigation directions are requested based on displayed multimedia information (e.g., determine whether an activation command, navigation command or the like is received). When a request for navigation directions is received, the process can continue to step 532 of the process 520 of FIG. 5.

In step 730, the multimedia content, typically containing non-navigation content, is routed to a secondary display 150 (and/or audio system) within the vehicle and/or prevented from being displayed on the display 232. Typically, the secondary display cannot generally be viewed by the operator of the vehicle. For example, the multimedia information can be routed to a display in the rear passenger area of the vehicle to be displayed. As a further example, the multimedia information may contain video data, television data or other such data wirelessly received and played back on a display in the rear seat area viewable by passengers in the rear seat(s).

The process 720 allows a navigation system to connect services from sources other than navigation system such as television, personal computer information, Internet content, content from a cell phone (e.g., address book) and/or other sources. Further, a user can take advantage of the typically larger display 232 of the navigation system when viewing content received through the cell phone 122, 124, such as Internet data, picture data, graphics data, multimedia data (e.g., movies, television and the like), and other such data. In some embodiments, the cell phone can communicate with server or other source of content notifying the server that the content is to be displayed on a larger display than the cell phone display. For example, the phone can supply a download bandwidth and/or screen size of the navigation system (e.g., by sending horizontal and vertical size information to the server). This can allow the server, when capable, to supply the content formatted for the display 232 of the navigation system (e.g., the content is reformatted by the server and/or cached by the server and retrieved).

Figure 8:
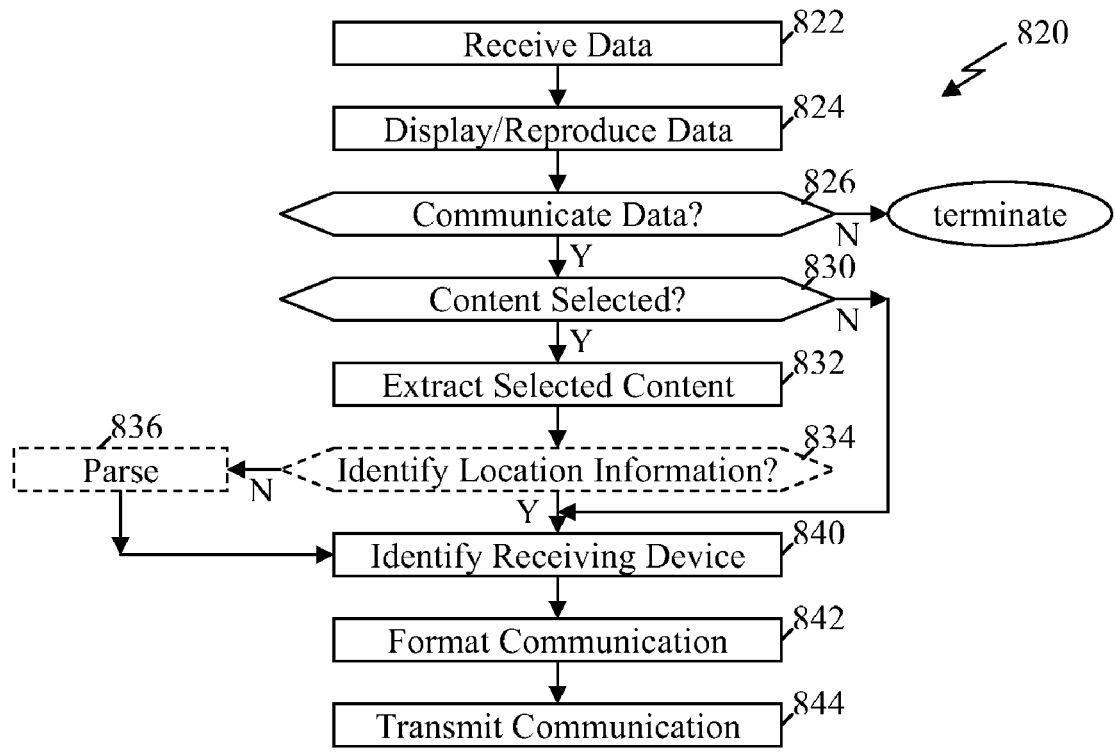
FIG. 8 depicts a simplified flow diagram of a process that allows information received through a consumer electronic device to be forwarded and/or directed to a navigation system.

FIG. 8 depicts a simplified flow diagram of a process 820 that allows information received through a consumer electronic device (e.g., cell phone 122, 124, PDA and/or other electronic device) to be forwarded and/or directed to a navigation system 126. This allows data from a device, such as a cell phone to be forwarded to the navigation system, in part, so that data does not have to be manually entered into the navigation system. The information can be transmitted over the communication link(s) 130 (e.g., wired connection and/or a wireless connection), and can be utilized, displayed and/or played back by the navigation system or a secondary display coupled with the navigation system.

In step 822, data, information and/or content is stored within and/or received and at least temporarily stored by the cell phone (or other device). In some instances, the data, information and/or content can include Internet content wirelessly received by the cell phone. In step 824, the cell phone displays and/or audibly reproduces the data. In step 826, it is determined whether a command is received to communicate some or all of data to a navigation system. This command is typically based on a user selection of a button, soft button, options, display and/or other such options through the operator interface 330 and/or display 332. When a command is not received, the process 820 terminates. Alternatively, step 830 is entered to determine whether some of the content has been selected or highlighted by the user. As described above, some cell phones 122, 124 and/or other electronic devices allow a user to highlight or select content displayed on the display 332. The selection of the content can be implemented through the operator interface 330, a touch screen display 332, a pointing device (e.g., a stylist), and/or the like. When content has not been highlighted or selected, the process 820 skips to step 840.

In step 832, the selected data is extracted. In some embodiments, the process can include an optional step 834, where it is determined whether location information can be identified in the extracted data. For example, the selected data can be parses or searched in an attempt to detect a label, marker, hidden text, partition, pattern, header and/or other identifiers that identify location information, and extracts the information when the location information can be identified. When location information cannot be identified, some embodiments proceed to step 836 where the remainder of the relevant data, content and/or information is parsed in attempts to identify location information. For example, the content (e.g., address book data, Internet content, graphical data, and/or substantially any other relevant content, data and/or information) can be searched looking for one or more key words; hidden text or data; formatting of the content; and/or other such identifiers.

In step 840, a device that is to receive a communication from the cell phone 122, 124 (e.g., the navigation system 126) is identified. In some instances this is based on a selection by a user, a communication link that is established and/or the like. In step 842, a communication is formatted incorporating the location information and/or some or all of the content. This formatting can include formatting for a desired communication protocol, adding headers (e.g., a predefined header labeling the communication as including location information and/or being a location communication), identifiers, hidden text or data, encoding and/or other such formatting. For example, the formatting can include incorporating an identifier of the navigation system so that the navigation system can detect that the communication is to be utilized by the navigation system, identifying location information and/or other such formatting. In step 844, the communication is transmitted to the navigation system.

The present embodiments interface a cell phone 122, 124 or other electronic device(s) to a mobile navigations system 126 to reduce and/or eliminate the need to manually enter data (e.g., location or GPS data) into the navigation system. Further, the present embodiments allow a navigation system to connect services from sources other than navigation, such as television, personal computer information, Internet, cell phone data and/or other information. Still further, in some implementations location information from a remote device (e.g., a cell phone with a GPS unit 344) can forward location information to the local cell phone that in turn can forward that location information to the navigation system allowing the navigation system to automatically provide navigation directions to the remote device.

A cell phone can provide, in some instances, a more user friendly method for providing information to the navigation system by supplying, for example, previously stored address information, Internet information (which may include map information), digitally entering full address information and/or other such information. The combination of the larger navigation system display 232 can be used to confirm entered numbers, for example, entered through a cell phone key pad creates a synergy between the cell phone and the navigation system.

As described above, some embodiments are implemented through software, hardware and/or a combination of hardware and software. Computer program products stored on a computer readable medium can be provided that allow the navigation system and/or the electronic device to establish the communication link, process data and communicate data. This allows, in part, the electronic device to communicate location information to the navigation system to reduce the amount of data that is manually entered into a navigation system.

Users can utilize the connectivity of a cellular phone or other electronic device to forward desired information from the phone to the navigation system. The information can include location information, Internet information from a wireless browser, multimedia information and/or other relevant information. In some instances, a user can find a name, address, phone number and/or merely a portion of information relating to a desired destination on a browser of a cellular phone. The information can be sent (e.g., via Bluetooth or some other link) to the mobile navigation system 126 without the need for the user to manually input this data or subset of the data into the navigation system. The navigation system can search its database(s) and memory 224 for the appropriate location. Once the desired location is identified the navigation system can set up a course and/or provide navigation directions for navigating the user to the desired location.

Further in some embodiments, the navigation system can automatically generate and/or map out navigation directions between a current location and a remote device, such as a cell phone, that has an embedded GPS system. The directions could then be automatically utilized by navigation system without the need of a remote individual verbally explaining the directions and without the need for the user to manually input data or subset of the data into the navigation system. There are many possible ways to communicate the location information (e.g., GPS coordinate data) from the GPS receiver of the cell phone 122, 124 to the mobile navigation system (e.g., to a GPS system of the navigation system). For example, the location information could be forwarded by the cell phone as a text message, which would likely limit the modification to the cell phone and/or software of the cell phone. The communication could be more intricate, for example, the mobile navigation system could present itself as a server and the cell phone becomes a client, or other such methods.

In some embodiments, operator interface 230 of the navigation system 126 can include a memory or record button that when selected causes the navigation system to record a destination, for example once a user arrives at the destination, for future reference. This allows multiple different users utilizing the navigation system (e.g., multiple drivers of the same vehicle) to get directions to the same location and/or to retrieve the directions at a later date. Furthermore as described above, information can be forwarded from the navigation system to the phone, for example, providing navigation information to the cell phone so that the user can access the navigation information when away from the navigation system.

In addition, the typically larger screen size of the display 232 of the navigation system 126 can provide an improved platform for connecting services and/or displaying content that can be accessed through the cell phone 122, 124. Contents and/or services such as TV programming (e.g., from Qualcomm's MediaFlo™), personally stored personal computer information (e.g., through Location FreeISling Media) such as music, photos, digital video recorder recordings, Internet and/or other data can be viewed and/or utilized through the display 232 of the navigation system. Still further, the navigation system 126 can operate as a display hub in a mobile environment, for example, by routing content, data and/or information to secondary displays 150 (e.g., a secondary display within a vehicle). This display hub operation, in some embodiments, can further include safety features that may limit a drivers ability to view or watch content, typically other than navigation information, while driving (e.g., by preventing content other than navigation information from being displayed on the display 232 when the vehicle is moving).

The combination of Internet mapping engines and the car navigation system can create a powerful tool for services that depend on delivering products to multiple locations. An example would be a pizza delivery service. Some embodiments allow a logistics administrator to input a sequence of consecutive stops, for example, using a mapping program on an navigation system, the Internet and/or other system, and then transferring the information to the navigation system through an electronic device and/or direct connection with a computer operating the mapping program, to allow the navigation system to determine appropriate navigation directions to the one or more stops. In some instances, the navigation system can store and/or program the results of the navigation directions for access by a user while the user performs the deliveries. This mapping can provide a low cost solution for businesses, including businesses under a tight budget.

In an example mode of operation, the communication link between the electronic device (e.g., cell phone 122, 124, PDA or other device) ad the navigation system 126 could be established through a simple link such as but not limited to Bluetooth to transfer information and/or a partial set of information to the mobile navigation system 126. An additional or alternative mode may rely upon a cell phone system such that the navigation system could also include cell phone connectivity to establish connectivity between the cell phone and the mobile navigation system, allowing a longer range over which location information (e.g., GPS coordinate information) could be transferred between the cell phone and the navigation system. The linking with the navigation system could allow a passenger and/or remote user with a GPS equipped phone or even just a phone that can send a simple text message such as an address or a store's name or phone number, to send information to the navigation system. The mobile navigation system could then generate navigation directions that a driver could utilize to get to a desired destination or rendezvous point.

Some embodiments can further include one or more electronic data files and/or computer program products that can be stored on a storage medium, that when incorporated and/or transferred into an appropriately configured digital apparatus (e.g., a mobile navigation system) causes the apparatus to operate in accordance with a process for retrieving location information and utilizing the information to generate navigation directions. Additionally or alternatively, some embodiments can further include one or more electronic data files and/or computer program products that can be stored on a storage medium, that when incorporated and/or transferred into an appropriately configured digital apparatus (e.g., a cell phone) causes the apparatus to operate in accordance with a process for retrieving location information and communicating that information for use by a mobile navigation system in generating navigation directions and/or instructions.

While the invention herein disclosed has been described by means of specific embodiments and applications thereof, numerous modifications and variations could be made thereto by those skilled in the art without departing from the scope of the invention set forth in the claims.

What is claimed is:

1. A method for use in navigating, comprising:
   receiving a communication, at a mobile navigation system from a wireless mobile external device, requesting navigation instructions;
   determining whether the communication comprises navigation information, where the navigation information is stored on the external device prior to the external device receiving a request for navigation instructions that identifies a desired location, and the navigation information comprises the desired location for which the navigation instructions are desired;
   extracting, at the mobile navigation system, the navigation information when the communication comprises the navigation information;
   identifying, at the mobile navigation system, a navigation location that corresponds to the desired location of the navigation information when the communication comprises the navigation information;
   validating, at the mobile navigation system, whether the desired location is valid relative to information of the navigation system;
   retrieving, at the mobile navigation system, a current location;
   generating, at the mobile navigation system, the navigation instructions between the current location and the navigation location;
   determining whether the communication comprises multimedia information; and
   displaying the multimedia information on a local display of the mobile navigation system, wherein the displaying the multimedia information, received from the external device, on the local display of the mobile navigation system comprises displaying the multimedia information formatted for the local display of the mobile navigation system in response to instructions from the external device to a remote source supplying the multimedia information designating that the multimedia information be formatted for the local display of the navigation system and not formatted for a display of the external device.

2. The method of claim 1, wherein the receiving the communication comprises wirelessly receiving the communication over Bluetooth wireless communication.

3. The method of claim 1, further comprising:
   determining whether the communication comprises a navigation command; and
   implementing the determining whether the communication comprises navigation information and implementing the extracting of the navigation information when the communication does comprises the navigation command.

4. The method of claim 3, wherein the determining whether the communication comprises a navigation command comprises determining whether the communication comprises a navigation system identifier for the mobile navigation system.

5. The method of claim 1, wherein the determining whether the communication comprises navigation information comprises parsing the communication, and determining whether the communication comprises a location information identifier.

6. The method of claim 1, further comprising:
   determining, in response to determining that the communication does not comprises navigation information, whether a vehicle within which the local display is located is moving;
   preventing the multimedia information from being displayed on the local display when the vehicle is moving; and
   routing the multimedia information to a secondary display and displaying the multimedia information on the secondary display when the vehicle is moving.

7. The method of claim 6, wherein the routing the multimedia information comprises routing the multimedia information to the secondary display that is generally not viewable by an operator of the vehicle.

8. The method of claim 1, further comprising:
   transmitting at least a portion of the generated navigation instructions to the external device.

9. The method of claim 8, wherein the generating the navigation instructions comprises generating one or more graphical image data representative of the navigation instructions such that the transmitting at least the portion of the generated navigation instructions comprises transmitting the one or more graphical image data to the external device to be displayed on the external device.

10. The method of claim 1, further comprising:
   identifying, in response to determining that the communication does not comprises navigation information, an alternate mobile destination system other than the mobile navigation system, where the alternate mobile destination is coupled with the mobile navigation system; and
   relaying at least content from the communication to the alternate mobile destination system to be played back through the alternate mobile destination system.

* * * * *